(No Model.) 3 Sheets—Sheet 1.
J. W. EISENHUTH.
CONDUIT ELECTRIC RAILWAY.
No. 523,271. Patented July 17, 1894.
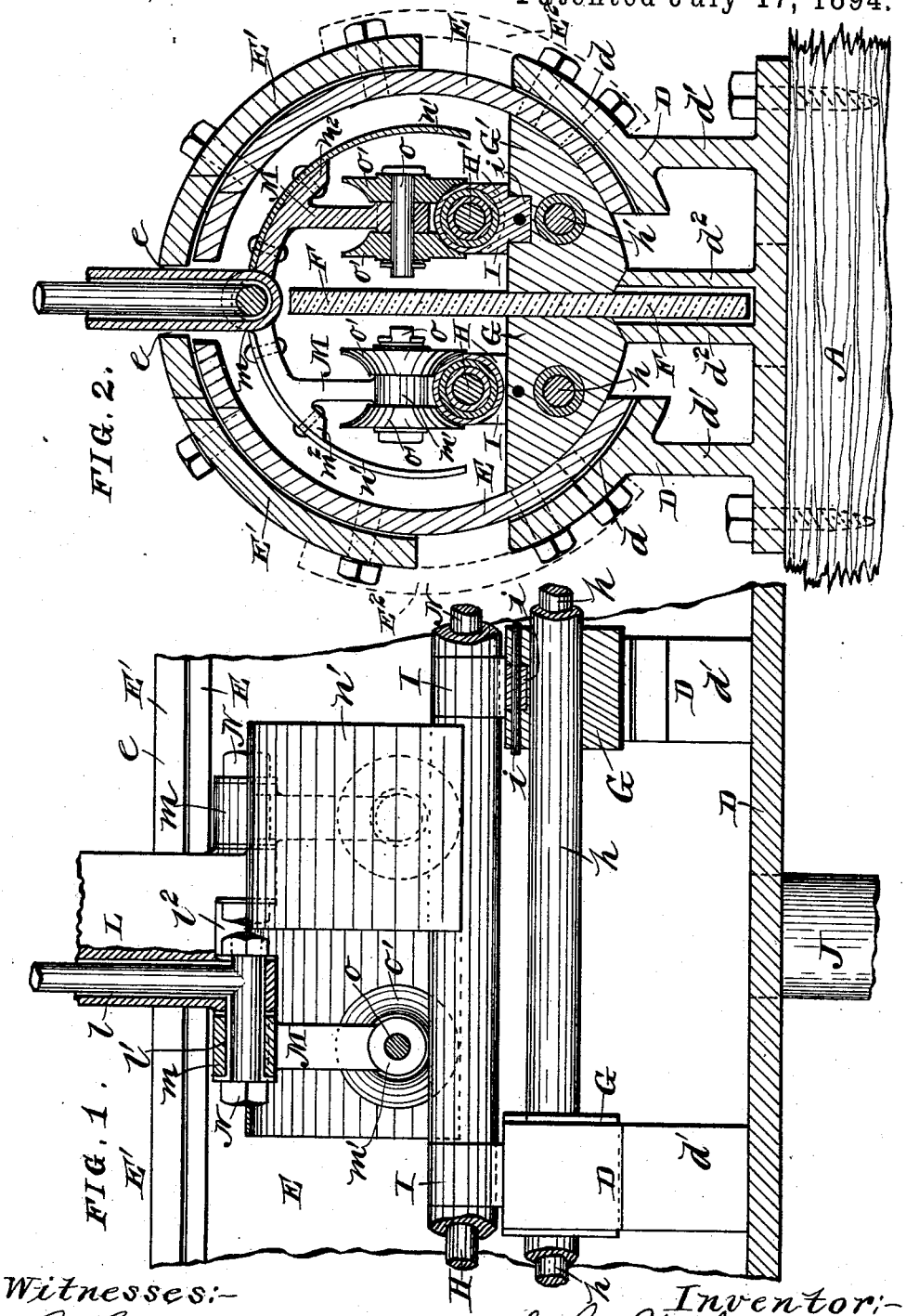
Witnesses:
C. Severance.
W. Harry Muzzy.
Inventor:
John Washington Eisenhuth
by Mason Fenwick & Lawrence
his Attorneys (No Model.) 3 Sheets—Sheet 2.
J. W. EISENHUTH.
CONDUIT ELECTRIC RAILWAY.
No. 523,271. Patented July 17, 1894.
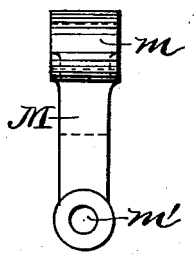
FIG. 7.
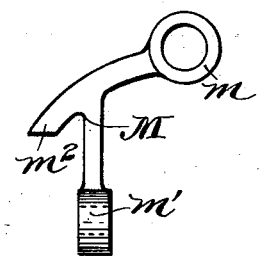
FIG. 8.
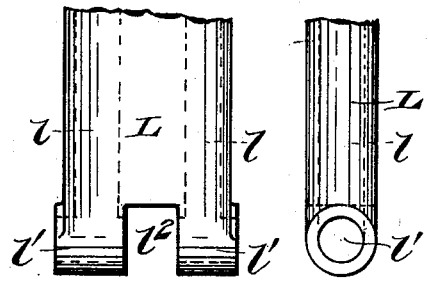
FIG. 4.
FIG. 5.
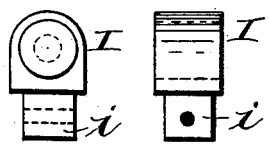
FIG. 9. FIG. 10.
FIG. 6.
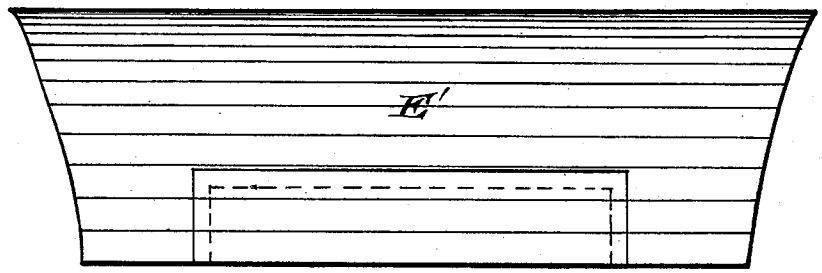
FIG. 3.
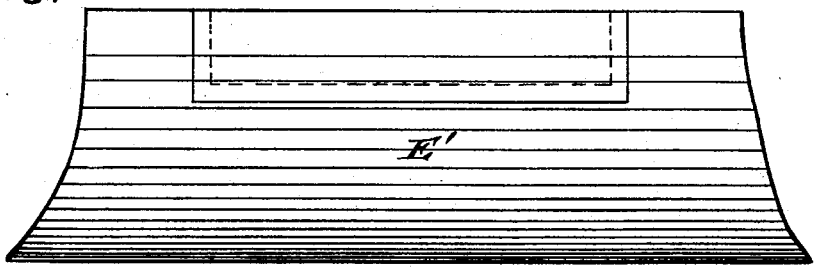
Witnesses:
Julius A. Haste.
Edward M. Greene.
Inventor.
John Washington Eisenhuth
by Wason Fonwick Lawrence
his Attorneys

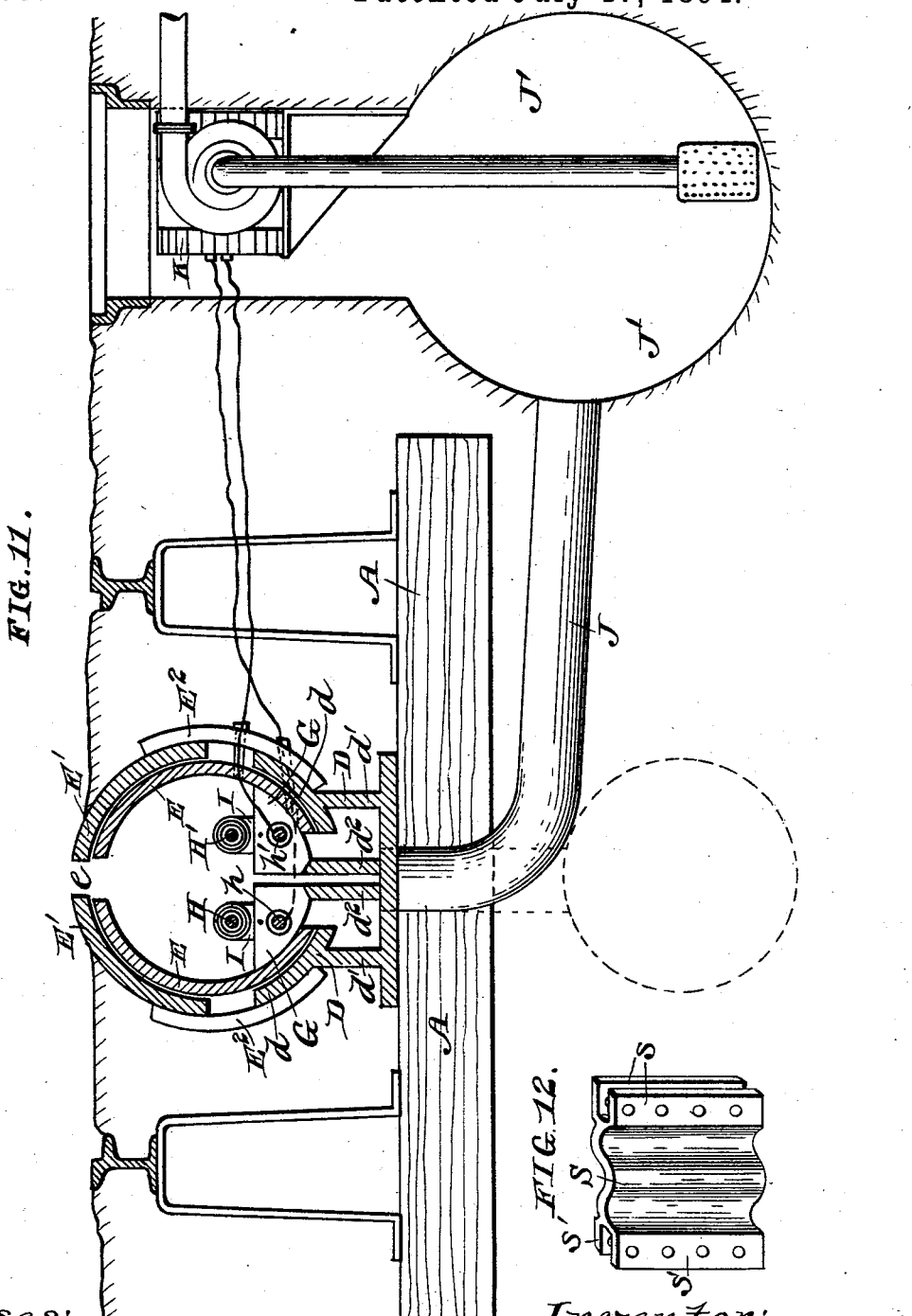

UNITED STATES PATENT OFFICE.

JOHN W. EISENHUTH, OF SAN FRANCISCO, CALIFORNIA.

CONDUIT ELECTRIC RAILWAY.

SPECIFICATION forming part of Letters Patent No. 523,271, dated July 17, 1894.

Application filed March 12, 1894. Serial No. 503,327. (No model.)

*To all whom it may concern:*

Be it known that I, JOHN WASHINGTON EISENHUTH, a citizen of the United States, residing at San Francisco, in the county of San Francisco and State of California, have invented certain new and useful Improvements in Underground Systems for Electric Railways; and I do hereby declare the following to be a full, clear, and exact description of the invention, such as will enable others skilled in the art to which it appertains to make and use the same.

My invention relates to improvements in underground systems for electric railways and the objects of the invention are, first, to provide a conduit in which the loss of the current from leakage will be reduced to the minimum; second, to so form said conduit that all dirt, water, &c., falling into the same can be readily removed; third, to provide a conduit in which the positive and negative wires or conductors may be very near together without any danger of short circuiting between them. I accomplish these objects by the devices described in the following specification and illustrated in the accompanying drawings, in which latter—

Figure 1. represents a central vertical section through a conduit embodying my invention. Fig. 2. represents a transverse vertical section through the same. Fig. 3. represents a detail top plan view of the conduit plates containing the manhole which permits access to the interior of the conduit. Fig. 4. represents a detail side elevation of the flat hollow trolley bar. Fig. 5. represents an end elevation of the same. Fig. 6. represents a top plan view of said bar. Fig. 7. represents a detail end elevation of the insulated trolley connecting arm. Fig. 8. represents a side elevation of the same. Fig. 9. represents an end elevation of the conduit securing holder or fastener. Fig. 10. represents a side elevation of the same, and Fig. 11. represents a transverse vertical section through the roadbed showing the conduit in place between the rails and also the drain system and pump for removing the water from the conduit; and Fig. 12. represents a detail perspective view of the compensating joint for joining the glass plates.

A in the drawings, represents the tie or sleeper of the roadbed and upon these sleepers at suitable distances apart, for supporting the conducting wires B, C, are mounted metallic chairs D. These chairs have concave segmental seats $d$ supported on standards $d'$ and so arranged as to receive the segmental plates E which when secured in said seats form a cylindrical conduit open at top and bottom. Other segmental plates E' are attached to the tops of the plates E and extend so as to form the edge of the conduit slot $e$. Other segmental plates $E^2$ join the edges of the segmental seats and the plates E'. These plates $E^2$ are shown in dotted lines in Fig. 2. and are only used when the circumstances of the case require additional strength in the conduit. All the faces of these plates which come in contact with each other are coated with insulating paint, asbestus or other suitable material and all the bolts securing said plates together are surrounded by insulated sleeves and have their heads and locking nuts provided with insulating washers so that all of said plates are entirely insulated from each other.

Two parallel arms $d^2$ rise from the center of each chair D and extend up between the lower edges of the segmental seats $d$ and are adapted to receive and hold a glass partition F when cemented therein so as to divide the conduit into two semi-circular chambers. Insulating blocks G, G' are secured in said segmental seats, one on each side of said glass partition, and these blocks are adapted to support the conducting wires H and H' and the feed wires $h$ and $h'$, the latter passing through passages cut in said blocks and the former mounted on top of said blocks by means of the holders or fastening devices I through which said conductors pass. These holders I, as shown in Figs. 9 and 10, are provided with extensions as $i$, which are adapted to enter recesses cut in the tops of the blocks G, G' and be secured in said blocks by keys $i'$ which pass through said extensions.

The edges of the glass plates forming the partition F are connected together by lead joints and at short distances expansion devices are introduced in said partition to compensate for the expansion and contraction of the glass and conduit because of the changes in the weather.

The chairs are not placed on every tie or sleeper but only at internals and near enough together to adequately support the conductors and prevent their sagging too much because of the pressure of the trolley thereon.

It will be seen by reference to Fig. 11. that any water falling through the slot into the conduit will be carried off in drain pipes J which discharge into cistern J' or a sewer. If there are no sewers that can be utilized, then the discharge must be into the cistern. The water is removed from the cistern by any ordinary pump operated by an electric motor K which draws its operating current from the feed wires in the conduit and the conduit is always thus kept free of water.

The sleepers are of course set at a sufficient distance below the surface of the ground to bring the top of the conduit on a level with the said surface and the rails are mounted on chairs attached to the sleepers to bring them on a level with the top of the conduit.

The trolley is composed of a trolley supporting bar L adapted to be attached to the bottom of the car and passed through the narrow slot of the conduit, and provided with two conducting wire passages $l, l$, one for the positive and one for the negative wire or conductor. This bar is formed at its lower end as shown in Figs. 4 and 5, with a horizontal passage $l'$ extending at right angles to the vertical passages $l$. The central portion of the lower end of the said bar is cut away to form a recess as at $l^2$ to receive the head or nuts of the bolts N which secure the trolley arms M to the bar L. These trolley arms are formed as shown in Fig. 8. of an angular arm provided with eyes $m, m'$ at each end but arranged so that the passages forming said eyes extend at right angles to each other. This angular arm is provided with a nose $m^2$ which assists in supporting concave segmental shields $n'$ which are secured to said trolley arms by bolts. The eyes $m$ of the trolley arms are slipped over their respective bolts and secured in position by the nuts on the ends of the said bolts; insulating sleeves and washers being interposed between said bolts and the parts through which they pass. The conductors in the trolley bar are then secured to their respective bolts, said conductors being insulated from the passages through which they run. The trolleys proper are formed by securing bolts $o$ carrying wheels $o'$ in the eyes $m, m'$. These wheels $o'$ are so grooved that when placed in position on each side of the eyes $m'$ they form semi-circular grooves that exactly fit over the respective conductors on each side of the glass partition. The feed wires $h, h'$ are provided to feed the main line or wires on heavy grades or where the length of the line requires it.

By means of the glass partition, short circuiting is absolutely prevented between the circuit wires.

The compensating joint as shown in Fig. 12, is composed of four clamping jaws $s, s$, and $s', s'$ connected together by a snake like or zig zag web of some soft metal as S. The ends of the glass plates are secured in the said clamp jaws by means of bolts which pass through insulating hard rubber sleeves. The parts $s, s'$ and S are all coated with insulating paint or other suitable insulating composition so that they will not make breaks in the insulating partition formed by the said glass plates. The part S being made of soft metal will allow the glass plates to expand and contract by the zig zag portion of said part S opening or closing as the case may be.

It will be noted that the plates forming the slot through which the trolley bar passes are insulated from the remainder of the conduit so that if the wires that are inclosed in said trolley bar should by any accident come in contact with said plates the circuit would not be short circuited as it otherwise would be.

What I claim as my invention is—

1. In an underground system for electric railways, the combination of supporting chairs, an insulated conduit mounted thereon, an insulating partition dividing said conduit, conducting wires mounted on each side of said partition in said conduit but insulated therefrom and a trolley adapted to engage said conducting wires, substantially as described.

2. In an underground system for electric railways, the combination of supporting chairs, a conduit mounted thereon and consisting of an inner and an outer shell, the inner shell being insulated from the outer and an insulating dividing partition in said conduit, insulating blocks mounted in said conduit, conducting wires mounted on said blocks and on each side of said partition and a trolley adapted to straddle said partition and engage the respective conducting wires, substantially as described.

3. In an underground system for electric railways the combination of supporting chairs, an insulated conduit mounted thereon, an insulating partition dividing said conduit, conducting wires mounted on each side of said partition in said conduit but insulated therefrom, a trolley adapted to engage said conducting wires, drain pipes connected to said conduit, a cistern into which said pipes discharge, a pump for removing the water from said cistern and a motor fed from the said conduit and actuating said pump, substantially as described.

4. In an underground system for electric railways, the combination of supporting chairs, an insulated conduit mounted thereon, an insulating partition dividing said conduit, conducting wires mounted on each side of said partition but insulated therefrom and a trolley adapted to engage said conducting wires and consisting of a trolley bar having conducting wire passages and provided with two pivoted trolley arms carrying trolleys and trolley shields respectively; said arms being adapted to lie on each side of said insulated partition so that said trolleys carried thereby may engage their respective conducting wires, substantially as described.

5. In a conduit for underground systems the combination of separable plates forming said conduit and the side walls of the slot for the passage of the trolley bar, and insulating material between said plates, whereby the plates forming said slot are insulated from the remainder of the conduit, substantially as described.

6. In an underground system for electric railways the combination of a conduit having an insulating partition and conducting wires on each side thereof and compensating joints introduced in said partition to allow of its expansion and contraction, substantially as described.

In testimony whereof I hereunto affix my signature in presence of two witnesses.

JOHN W. EISENHUTH.

Witnesses:
LOUIS F. DEMOND,
CHAS. A. REYNOLDS.